J. M. DODGE.
Car Axle-Boxes.
No. 136,424.
Fig. I.
Patented March 4, 1873.
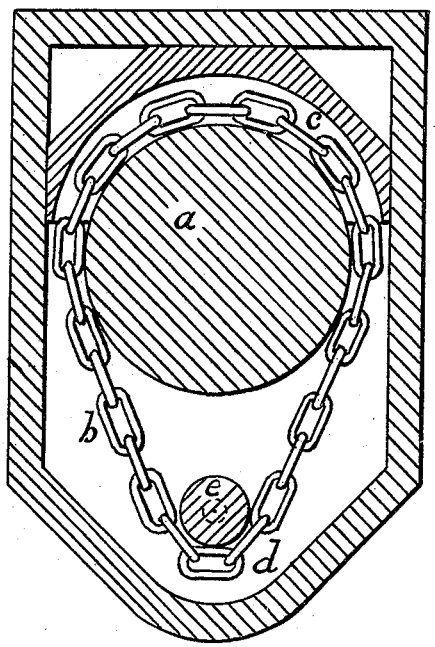
Fig. II.
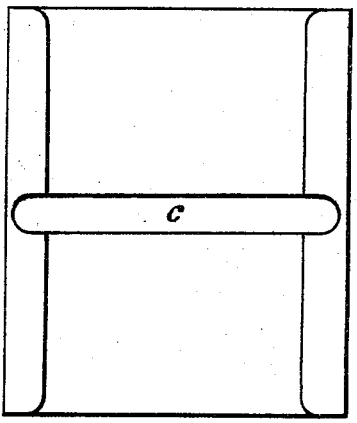
WITNESSES.
Wm Kemble Hall.
Eugene S. Bush.
INVENTOR.
James Mapes Dodge

UNITED STATES PATENT OFFICE.

JAMES M. DODGE, OF NEWARK, NEW JERSEY.

IMPROVEMENT IN CAR-AXLE BOXES.

Specification forming part of Letters Patent No. 136,424, dated March 4, 1873.

*To all whom it may concern:*

Be it known that I, JAMES MAPES DODGE, of Newark, in the county of Essex and State of New Jersey, have invented certain new and useful Improvements in Lubricators for Journals, of which the following is a specification:

Nature and Object of the Invention.

The said invention relates to the lubrication of axle and shaft journals; and it consists of an endless chain or band hanging over the revolving shaft in a groove cut for its reception in the bearing or brasses, and dipping into a reservoir of oil or other lubricating material placed below the journal. A suitable guide-roller retains the chain in position, and gives it sufficient tension to insure its motion. The revolution of the journal carries with it the chain, and raises, by contact or adhesion, the oil to the groove in the upper bearing, whence it is distributed by its own natural tendency to diffusion and the rotating motion of the shaft. The motion of the band, caused by that of the journal, supplies the lubrication as it may be required. The surplus oil supplied to the bearing falls again to the receptacle, from which it may be again raised by the revolution of the chain.

Description of the Drawing.

Figure 1 of the drawing represents, in section, an elevation of a railroad-car axle and axle-box; and Fig. 2, an inverted plan of the brass or bearing of the same.

The journal $a$ carries a chain, $b$, which traverses freely the groove $c$ of the bearing and dips into the oil-receptacle $d$, when its lower portion is retained by the sheave or roller $e$.

In journals where under-brasses are required the oil-receptacle may be made in the lower brass, or it may be below the brass in the pillow-block, with the chain or band passing through suitable holes. Where the extent of vibration is sufficient in reciprocating bearings the same method of lubrication may be employed. In the case of long journals two or more revolving chains may be used.

The chain may travel and be retained in a groove formed in the journal instead of in the brass; and the form of the invention may be otherwise varied in adaptation to the requirements of the circumstances in which lubrication may be required.

Claim.

I claim as my invention—

The combination of the chain and roller with a journal, substantially in the manner and for the purpose described.

JAMES MAPES DODGE.

Witnesses:
 W. K. HALL,
 EUGENE S. BUSHE.